W. Brown.
Farm-Gate.
Nº 75517        Patented Mar. 17 1868
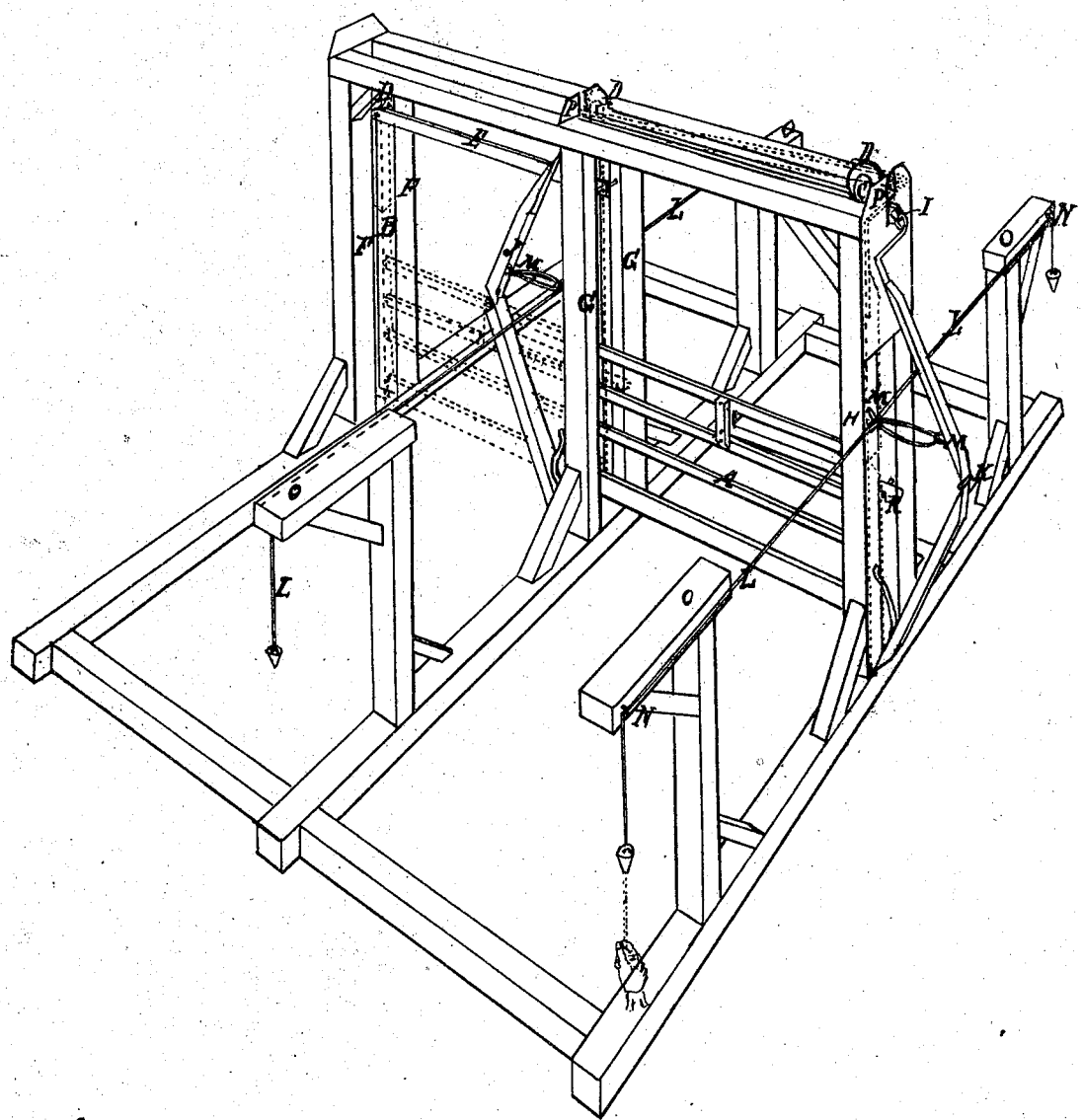
Witnesses
J. W. Heughtelin
J. G. Retchan
Inventor
Wm Brown
Per A Heruxe
Thos S Sprague

United States Patent Office.

WILLIAM BROWN, OF ADDISON, MICHIGAN.

Letters Patent No. 75,517, dated March 17, 1868.

---

IMPROVEMENT IN FARM-GATE.

---

The Schedule referred to in these Letters Patent and making part of the same.

---

TO WHOM IT MAY CONCERN:

Be it known that I, WILLIAM BROWN, of Addison in the county of Lenawee, and State of Michigan, have invented a new and useful Improvement in Farm-Gates; and I do declare that the following is a true and accurate description thereof, reference being had to the accompanying drawings, and to the letters of reference marked thereon, and being a part of this specification.

This invention consists in so constructing a gate that it can be opened and closed by persons wishing to drive through it, without the trouble of alighting from the vehicle. This is done by causing the bar, upon which the gate is suspended, to assume an inclined position to the right or left, as occasion may require, by proper combined levers, provided with suitable connections, by which said bar is made to assume the position described.

To accomplish this end, I construct a gate, A, with two upright bars, B C, the bar B being shorter than the bar C, and both of them provided with a wheel, D. The wheel upon the shorter bar, B, is designed to run upon the horizontal bar E, which is attached to the upright double posts F, at one end, by any suitable device, and at its opposite end, by a similar device, to the centre double posts G. The wheel upon the top of the larger bar, C, is designed to rest upon a similar horizontal bar, hung upon proper rods, which pass through the double posts G and H, near their top. The ends of this last-described bar are attached to cranks, I, which are also attached to the levers J, which are hinged at K, and pivoted at the bottom to the double posts G and H. These levers are operated by proper cords or chains, L, which pass through proper rings or blocks, M, to and through other proper rings or blocks, N, attached to the posts and arms O. P are proper guides to govern the position of the transverse bar, which is described as being hung upon rods through the double posts G and H in its movements. R is a proper latch, with which to fasten the gate.

By pulling the proper cord or chain, the gate may be unlatched and opened when closed, or latched and closed when opened. The whole may be covered with a suitable roof, if required, to protect the wheels and bars, upon which they run, from being obstructed by snow or ice.

What I claim as my invention, and desire to secure by Letters Patent, is—

1. The levers J, when constructed and operating for the purposes hereinbefore described.
2. The combination of the above levers with the gate A, the upright bars B C, the wheels D, the horizontal bar E, the double posts F G H, the horizontal bar, described as being hung upon rods near the top of the posts G H, the cranks I, the rings or blocks M N, the cords or chains L, the posts and arms O, the guides P, and the latch R, when constructed, arranged, and operating substantially as and for the purposes herein set forth.

WM. BROWN.

Witnesses:
  H. S. SPRAGUE,
  J. W. HOUGHTELIN.